(12) United States Patent
Noorizadeh et al.

(10) Patent No.: US 12,198,016 B2
(45) Date of Patent: Jan. 14, 2025

(54) MACHINE LEARNING MODEL TRAINING SYSTEM

(71) Applicant: Bank of America Corporation, Charlotte, NC (US)

(72) Inventors: Emad Noorizadeh, Plano, TX (US); Ion Gerald McCusker, Allen, TX (US); Ravisha Andar, Plano, TX (US); Bharathiraja Krishnamoorthy, Plano, TX (US); Ramakrishna R. Yannam, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 1173 days.

(21) Appl. No.: 16/997,179

(22) Filed: Aug. 19, 2020

(65) Prior Publication Data

US 2022/0058512 A1 Feb. 24, 2022

(51) Int. Cl.
*G06N 20/00* (2019.01)
*G06N 5/04* (2023.01)
*G06N 20/20* (2019.01)

(52) U.S. Cl.
CPC ............... *G06N 20/00* (2019.01); *G06N 5/04* (2013.01); *G06N 20/20* (2019.01)

(58) Field of Classification Search
CPC .......... G06N 5/04; G06N 20/00; G06N 20/10; G06N 20/20
See application file for complete search history.

(56) References Cited

U.S. PATENT DOCUMENTS

| | | | | |
|---|---|---|---|---|
| 10,268,684 | B1* | 4/2019 | Denkowski | G06F 40/44 |
| 11,328,129 | B2* | 5/2022 | Fuerstenau | G06N 3/044 |
| 11,386,459 | B2* | 7/2022 | Jordan | G06Q 30/0277 |
| 2018/0349514 | A1* | 12/2018 | Alzate Perez | G06F 16/90332 |
| 2020/0294195 | A1* | 9/2020 | Wang | G06T 3/4046 |
| 2020/0327379 | A1* | 10/2020 | Dong | G06N 3/084 |
| 2020/0344185 | A1* | 10/2020 | Singaraju | G06F 16/9024 |
| 2021/0081848 | A1* | 3/2021 | Polleri | G06F 11/3409 |
| 2021/0224684 | A1* | 7/2021 | Sarkar | G06F 16/907 |
| 2022/0051093 | A1* | 2/2022 | Skaljak | G06T 15/06 |

OTHER PUBLICATIONS

Christopher Flynn PhD, Machine Learning Model Serialization, Jan. 4, 2020, p. 2.*

* cited by examiner

*Primary Examiner* — Shane D Woolwine
(74) *Attorney, Agent, or Firm* — Weiss & Arons LLP

(57) ABSTRACT

A system for horizontal scaling of retraining machine learning models across operational domains is provided. The system may reduce computational overhead associated model retraining. The system may include an artificial intelligence ("AI") engine that determines target machine learning models that need to be retrained in response to changed training data. The AI engine may assign daemons to the target models. The daemons may gather retraining requirements such as source code and training data. The daemons may schedule the target models for retraining on a CPU or a GPU based model training system.

3 Claims, 10 Drawing Sheets

MACHINE LEARNING MODEL TRAINING SYSTEM

FIELD OF TECHNOLOGY

Aspects of this disclosure relate to using artificial intelligence ("AI") to train machine learning models.

BACKGROUND

Industries are increasingly relying on machine learning models to drive decision making. A machine learning model is a mathematical algorithm which makes assumptions about information it ingests. Using the assumptions, the model approximates properties of the ingested information and calculates new properties or determines how to respond to the ingested information.

Interactive voice response ("IVR") systems may utilize machine learning models. IVR systems provide automated tools for interacting with human callers. A caller may initiate contact with an IVR system and provide inputs to the IVR system. The caller inputs may include voice data, text data and selection of options displayed to the caller. These inputs typically correspond to a caller attempting to express a purpose for contacting the IVR system. The IVR system may use machine learning models to discern a meaning of caller inputs and efficiently satisfy the caller's purpose.

An IVR system may not be able to discern the purpose or goal of a caller. In such instances, the IVR system may link the caller to a human agent. An IVR system may also "think" it understands the purpose or goal of the caller. However, the IVR system may in fact have misinterpreted caller inputs. In some scenarios, the IVR system may seem to correctly interpret individual caller inputs. However, the IVR system may in fact be unable to understand a context of the caller input within a larger conversation.

Machine learning models included in an IVR system may be trained to discern the meaning of caller inputs based on training data. Machine learning models may be trained to interpret data associated with a specific computing problem. Illustrative computing problems may include classifying images or speech recognition. Because each of these computing problems presents unique, nuanced technical challenges, each problem may require its own set of training data.

It is technically challenging to train complex IVR systems that include multiple, interconnected machine learning models. Specialized hardware and software are needed to training the machine learning models. Such specialized equipment is expensive and requires significant resources to operate. For example, power consumption of a computing system for training one machine learning model may be ~400 Watts ("W").

Different machine learning models require different amounts of time and computing resources to train. Training time may range from minutes, hours or days. Some machine learning models may need to be retrained frequently and others less frequently. Some models may require even more power consumption to train. As described herein, a MACHINE LEARNING MODEL TRAINING SYSTEM provides technical solutions for reducing power consumption and utilization of model training systems.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
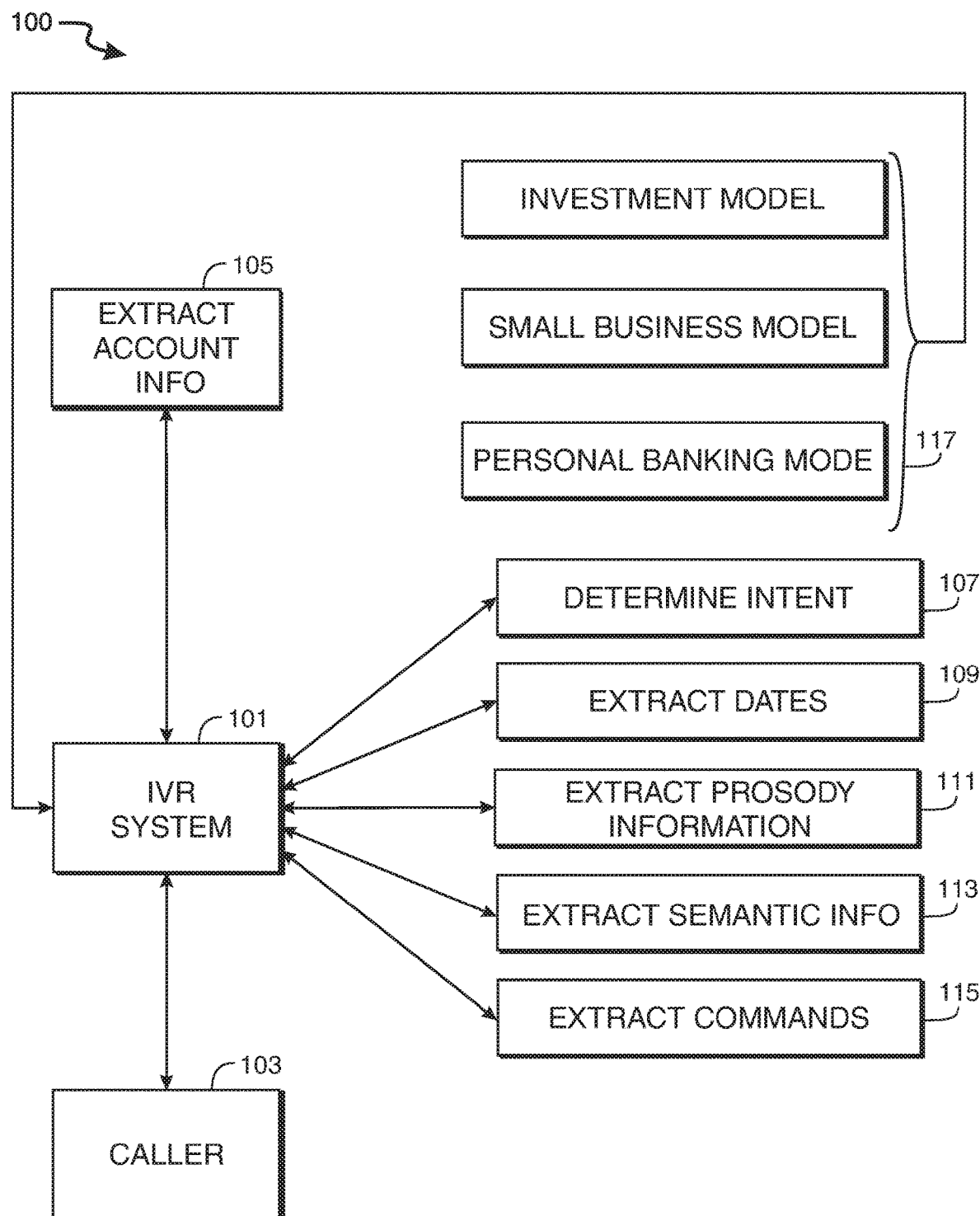
FIG. 1 shows an illustrative system in accordance with principles of the disclosure.

Apparatus for an artificial intelligence ("AI") system for reducing computational load of a machine learning model training system is provided. The system may include a frontend user interface. The frontend user interface may provide software tools for changing training data associated one or more machine learning models. The models may be included in a computer program product. The computer program product may include an interactive voice response ("IVR") system.

An IVR system may provide automated tools for interacting with human callers. An IVR system may include multiple and interconnected machine learning models. A caller may initiate contact with an IVR system and provide inputs to the IVR system. The caller inputs may include voice data, text data and selection of options displayed to the caller. These inputs typically correspond to a caller attempting to express a purpose for contacting the IVR system.

The IVR system may use machine learning models to discern a meaning of received caller inputs and efficiently satisfy the caller's purpose. For example, the IVR system may include machine learning models that determine caller intent and extract dates, account types, and monetary values from caller inputs.

Models included in the IVR system may be trained to discern the meaning of caller inputs based on training data. Machine learning models may be deployed in a variety of different contexts and the models may be trained to interpret inputs associated with a specific computing problem. Each computing problem may be associated with a unique set of training data.

The AI system may include a model training system. The model training system, using the training data, is configured to train a plurality of machine learning models. Using the training data, the model training system may train a machine learning model how to understand future caller inputs that may not be included in the training data.

Training data sets are typically large, and training models using these data sets requires significant computing resources. Exemplary training data sets and sizes are shown below in Table 1:

TABLE 1

Illustrative Computational Problems and Training Data

| Computational Problem | Illustrative training data | Size |
|---|---|---|
| Image recognition | 330K images<br>5 captions per image<br>1.5 million objects<br>80 object categories<br>250,000 people images | ~25 MB |
| Natural Language Processing | ~30,000,000 sentences and translations | ~15 GB |
| Audio/Speech Datasets | ~100,000 music tracks | ~1000 GB |

Use of AI in computer program products that perform financial transactions is subject to rigorous regulations. Machine learning models deployed to execute financial transactions must be implemented, trained and tested in various environments before being deployed. In the context of an IVR system, the regulations ensure machine learning models perform financial expected and authorized by callers. Typically, implementation, training and testing requires significant computing resources.

The model training system may include a CPU (central processing unit) based training system. An illustrative CPU training system can train an average of ~115 examples/second. The model training system may include a GPU (graphics processing unit) based training system. An illustrative GPU training system can train an average of ~14 k examples/second. Larger scale model training may utilize a GPU cluster for multi-GPU computing. Other viable computing options include TPUs (Tensor Processing unit) and FPGAs (Field Programmable Gate Arrays), hardware specially designed for training machine learning models.

Model training and associated computing hardware typically consumes significant power. For example, a GPU training system is capable of performing operations on a batch of images of 128 or 256 images at once in just a few milliseconds. However, the power consumption for the GPU system is around ~250 W and requires hardware that requires an additional 150 W of power, for a total power consumption of ~400 W. This total power consumption is for training just one model.

Another technical challenge associated with model training is retraining of models in response to updates or changes to training data. When changes to the training data are received, they may or may not impact all models in included in a computer program product. Retraining all models in computer program product may require significant computing resources.

The AI system disclosed herein provides a technical solution for determining which target models need to be retrained in response to changes in training data. The AI system also utilizes technical innovations to meet rigorous regulatory requirements governing use of machine learning models for financial transactions. The AI system only retrains targeted models, resulting in significant savings in computing resources. The system also eases the burden of regulatory compliance by reducing uncertainty regarding which models have been trained with which data sets.

The AI system may include a model services server running an AI engine. The model services computer server may be a network connected computer system. A computer server, as disclosed herein, may include a processor circuit. The processor circuit may control overall operation of the server and its associated components. The processor circuit may include hardware, such as one or more integrated circuits that form a chipset. The hardware may include digital or analog logic circuitry configured to perform any suitable (e.g., logical) operation.

For example, a computer server may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms, AI algorithms, or any other suitable information or data structures. Components of the server may be linked by a system bus, wirelessly or by other suitable interconnections. System components may be present on one or more circuit boards. In some embodiments, the components may be integrated into a single chip. The chip may be silicon-based.

The server may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable the server to perform various functions. For example, the non-transitory memory may store software applications such as an operating system, application programs, and an associated database. Some or all of computer executable instructions of the computer server may be embodied in hardware or firmware components of a computer server.

A computer server may include cloud computing and virtualization implementations of software. Such implementations may be designed to run on a physical server supplied externally by a hosting provider, a client, or other virtualized platform. Software application programs, which may be used by the computer server, may include computer executable instructions for invoking user functionality related to communication, such as email, short message service ("SMS"), and voice input and speech recognition applications. Software application programs may utilize one or more algorithms, as disclosed herein, that serialize machine learning models, compare training data sets, test machine learning models, track input/output of machine learning models, or any other suitable task.

A computer server may include a communication circuit. The communication circuit may include a network interface card or adapter. When used in a WAN networking environment, a computer server may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the server may be operated in a client-server configuration to permit retrieval of web pages from a web-based server. Web browsers can be used to display and manipulate data on web pages.

A computer server may include various other components, such as a display, battery, speaker, and antennas.

Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A computer server may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices, mobile phones, multiprocessor systems, minicomputer systems, microprocessor systems, mainframe computers, distributed computing environments that include any of the above systems or devices, and the like.

A computer server may utilize computer-executable instructions, such as program modules, executed by a processor. Generally, program modules include routines, programs, objects, components, data structures, etc. that perform particular tasks or implement abstract data types. A computer server may be operational with distributed computing environments where tasks are performed by remote processing devices that are linked through a communications network. In a distributed computing environment, program modules may be located in both local and remote computer storage media including memory storage devices. A computer server may rely on a network of remote servers hosted on the Internet to store, manage, and process data (e.g., "cloud computing" and/or "fog computing").

A computer server disclosed herein may be produced by different manufacturers. For example, a program developer may connect to a frontend user interface via a first server, and an AI engine may be run on a second server, a model training system may be run on a third server and a model testing environment may be run on a fourth server. A computer server may capture data in different formats. A computer server may use different data structures to store captured data. A computer server may utilize different communication protocols to transmit captured data or communicate with other systems. Despite such operational differences, computer servers may be configured to operate substantially seamlessly to interact with a human caller, execute machine learning models and run an AI engine across different systems operating systems, hardware or networks.

The AI engine may be configured to regulate a computational load of the model training system. The AI engine may examine changes applied to training data. The AI engine may determine a target set of models that need to be retrained based on the changes. The target set of models may be less than a total number of models included in a computer program product. Models included in the target set may be those identified by the AI engine that need to be retrained as a result of the changes to the training data.

The AI engine may schedule the target set of models for retraining by the model training system. The AI engine may extract source code for each of the models in the target set. The AI engine may extract a training data set for each of the models in the target set.

The AI engine may associate one or more operational domains with each model in the target set. The AI engine may associate an operational domain with a model based on content of training data associated with each model. An exemplary operational domain may include a consumer domain for servicing individual customers. An exemplary operational domain may include a small business domain for servicing small to mid-size business entities. An exemplary operational domain may include an investment domain for servicing investment related activity. Each operational domain may use independent training data to generate machine learning models that are tuned to recognize specific nuances, language and terminology associated with services or products offered by the operational domain.

An IVR system may include different computer program products that include machine learning models specially trained to process caller inputs associated with functionality provided by an operational domain. The computer program products must each be trained and retrained as needed to ensure that the machine learning models are configured to understand domain-specific caller inputs. Retraining all the machine learning models in a computer program product each time training data is updated may require excessive computing and power resources. The AI engine may limit model retraining to targeted machine learning models, reducing computing and power consumption.

At a scheduled training time, the AI engine may transfer the extracted model source code and extracted training data set to the model training system. The AI engine may configure the model training system to retrain each extracted model using the extracted training data set and in accordance with requirements of the operational domains associated with each extracted model. Such targeted model retraining reduces the aggregate number of models trained by the model training system per unit of time, thereby reducing an overall computational load of the model training system.

At least one model in the target model set may be associated with two or more operational domains. For example, one extracted model may be utilized by both the consumer domain and the small-business domain. The AI engine may assign a daemon to each extracted model in the target set of models. A daemon, as used herein, may refer to a computer program that runs as a background process and is not under direct control of a user. A daemon may process requests, received from the AI engine, for model retraining services. The daemon may be dormant when not required. After the AI engine identifies targeted models that need to be retraining, the daemon may schedule the training to equalize computational load and power consumption of the model training system.

A daemon may be associated with at least one of the operational domains. The daemon may apply model training settings that are unique to the associated operational domain. For example, two operational domains may utilize the same set of training data. However, each operational domain may assign different weights to the labels associated with the training data. A daemon may be configured to provide any domain-specific training settings to the model training system.

At a scheduled training time, the daemon may transfer the extracted source code and the extracted training data to the model training system. The scheduled training time may be determined by the AI engine. The scheduled training time may be determined by the daemon. The scheduled training time may be determined by the model training system.

A daemon may provide, to the model training system, any domain-specific training settings. A model in the target set may be associated with two or more operational domains. The AI engine may assign two or more operational domains may be assigned two or more daemons.

The AI engine may determine whether the model training system needs to train a model two or more times. For example, for an extracted model, the AI engine may determine whether the changes would cause operational differences when the model operates in different domains. When there are operational differences, the extracted model may be trained once using the same training data for two or more operational domains. Reducing the number of instances of model training, even for different operational domains, further reduces computational and power resources consumed by the model training system. In some embodiments, the two or more daemons assigned to the extracted model may determine whether the model training system needs to train the at least one model two or more times.

In some embodiments, the training requirements of the two or more operational domains may be mutually exclusive. In these cases, an extracted target model must be trained independently for each operational domain, using domain-specific training settings. Two or more daemons may be assigned to the extracted target model. Each of the two or more daemons assigned to the extracted target model may configure the model training system to independently train the extracted model, in accordance with the domain-specific training settings.

Assigning daemons to interact directly with the model training system may allow for horizontal scaling of the AI system described herein. The AI engine may detect changes to training data. The AI engine may identify targeted models that need to be retrained as a result of the changes to the training data. However, after identifying the targeted models, the AI engine may handoff scheduling of the training to a daemon. The daemon may interact with the model training system and schedule the target model for retraining using domain specific settings.

A daemon may also abstract scheduling of the target model training from the underlying model training system. Thus, different model training systems may be deployed (e.g., CPU, GPU, TPU, FPGA), and the daemon may be configured to schedule training of different target models on different model training systems. For example, a model that only takes a few minutes to retrain may be scheduled with a CPU based model training system. A model that may take a few hours to train may be scheduled with a GPU based model training system.

Daemons may also allow model training systems to be taken offline for maintenance or repair without disrupting AI controlled model training. When a model training system is taken off-line, a daemon may schedule model training on the remaining and available model training systems. Because the model training system taken off-line was not itself scheduling training, no adjustments to scheduled model training are needed before taking the system off-line.

Daemons may also allow for scaling of AI driven mode training by allowing for additional model training systems. When a new model training system is added to the AI system, daemons may begin to schedule training on the newly added system. The AI engine may monitor performance of the daemons. When a threshold number of daemons are waiting to train their associated models, the AI engine may determine that additional model training system are needed to meet training demands.

The AI engine may determine that a specific operational domain requires relatively more instances of model training than other operational domains. Additional model training systems may be added that are dedicated for use by models associated with the specific operational domain. The AI engine may generate an alert indicating that models associated with the specific operational domain have been undergoing more frequent model training than models associated with other operational domains.

Daemons may be configured to communicate with each other and thereby increase efficiency of model training. For example, different models and different training data may require different amounts of time to train. Daemons may be configured to look for a time window that is sufficient for training its associated model. The daemon may locate a sufficient training window that is earlier in time that prior scheduled model trainings.

The AI system may include two or more model training systems. Each model training system may be accessible by the daemon assigned to the target model set. A daemon may be configured to split model training across two or more model training systems. For example, a daemon may split a training data set. The daemon may train a target model on a first model training system using a first half of the training data. The daemon may train the target model on a second model training system using a second half of the training data. The daemon may ensure that both trainings are integrated into the final retrained target model.

The daemon may schedule retraining of a target model on a model training system using a first half of the training data during a first time window. The daemon may schedule retraining of the target model on the model training system using a second half of the training data during a second time window. The daemon may ensure that multi-part model trainings are all applied and integrated into the final retrained target model.

The AI system may include a database. The database may be accessible to each of the model training system. The database may be accessible to a daemon assigned to a target model. The database may provide a central storage location for storage, after model retraining, of a serialized version of the retrained target models. The database may link the training data (applied to retrain the target model) to the file storing a serialized version of the retained model. The database may also provide a central storage location for the training data applied to each serialized target model.

The AI system may include a model inventory application. The model inventory application may track and record actions of the AI engine, model training systems, daemons and database. For example, the model inventory application may track storage locations of the most-recent training data used to retrain a target model. The model inventory application may provide necessary records to confirm that machine learning models deployed in commercial environments are being retrained and otherwise maintained in compliance with regulatory requirements.

An artificial intelligence ("AI") system for horizontal scaling of machine model training across a plurality of operational domains is provided. The AI system may include a user interface. The user interface may change model training data associated with a computer program product. The AI system may include AI engine. The AI engine may determine a target machine learning model included in the computer program product that requires retraining. The AI engine may determine that the target model needs retraining based on the changes to the model training data.

For example, the AI engine may identify a target model based on determining which machine learning models included in a computer program product have been trained using a previous version of the training data. In other embodiments, the AI engine may identify a target model by estimating how changes to the training data may impact performance of the target model. The AI engine may estimate the impact on model performance in one or more operation domains.

The AI engine may submit a series of test inputs to a target model. The test inputs may be formulated based on the changes to the training data. The test inputs may be formulated based on caller inputs typically received when the target model is deployed in a specific operational domain. The AI engine may determine whether an output of the target model in response to the test input is within an acceptable limit associated with the target model. When the outputs are outside acceptable limits, the AI engine may determine that the target model needs to be retrained using the changed version of the training data.

After determining a target model that needs to be retrained, the AI engine may assign a daemon to the target model. The daemon may orchestrate retraining of the target model. The daemon may extract source code of the target model. The daemon may extract the source code from a central file location maintained by a database system.

The daemon may formulate a training data set for retraining the target model. The training data set may incorporate detected changes to training data previously used to the train the target model. The daemon may reduce computational load of the model training system by estimating computational requirements for retraining the target machine learning model using the formulated training data set.

Based on the estimated computational requirements, the daemon determines whether to schedule the retraining of the target machine learning model on a CPU of GPU model training system. The daemon schedules the retraining of the target machine learning model such that the computational load of the selected CPU of GPU model training system does not exceed a threshold level.

The AI system may include a model serializer. The model serializer may serializes retrained target machine learning models. The serialization process saves a retrained machine learning model as an object in a stream of bytes in a file location. The model training system may serialize a retrained model with the formulated training data applied during the retraining. Serializing the target model with the training data allows the AI engine to determine an impact of future changes to training data applied to a retrained target model.

The daemon may capture output of the model serializer. The daemon may link a serialized model to the training data set applied when retraining the model. The daemon may store the serialized model and associated training data set in a network accessible storage location.

The AI system may include a model inventory manager application. The model inventory manager application may control integration of a retrained target model into a computer program product. For example, the model inventory manager may ensure that a retrained model is replaced within all computer program products that utilize the model. The AI engine may be configured to determine whether because of changes to the retrained model, any other models, even models whose training data has not changed, need to be retrained. For example, after retraining, a model may generate output that is formatted differently than before the retraining. Other models that process output of the trained model may also need to be retrained to understand the new output format.

The model inventory manager application may control access by each of the plurality of operational domains to a computer program product. The inventory manager application may ensure that a model retrained for a specific operational domain is integrated into computer program products of that domain. The model inventory manager application may log access by each of the plurality of operational domains to a retrained model. The logged records may provide verification that machine learning models are being retrained using training data appropriate for an operational domain. The logged records may provide verification that the operational domain is utilizing models that have been retrained using current training data appropriate for the operational domain.

The model inventory manager application may redirect computer servers associated with each operational domain to a retrained machine learning model. The model inventory manager may use a runtime operation to incorporate the retrained machine learning models into computer program products utilized by the operational domain. The runtime operation may not require restarting any of the computer servers running the computer program product when integrating a retrained model into a computer program product.

The system may include one or more testing environments. A testing environment may verify that a retrained model is interpreting caller inputs in a logical manner. A testing environment may include development, certification and production testing environments.

The model inventory manager application may redirect computer servers associated with each testing environment to the retrained machine learning models. The model inventory manager may use a runtime operation to incorporate the retrained machine learning models into different testing environments. The runtime operation may not require restarting any of the computer servers of a testing environment.

An illustrative computer program product may include a plurality of machine learning models that process human speech. Different operational domains may utilize different machine learning modules. Each operational domain may utilize different lexicon and may offer different products/services. Illustrative operation domains may include a consumer domain, a small business domain and an investment domain.

The model inventory manager may control access by each of the plurality of operational domains to a centrally stored copy of a retrained model. A centrally stored copy of a retrained model may allow the AI engine to determine target models that need to be retrained in response to further changes to training data. By identifying target models that need to be retrained, the AI engine avoids retraining all models included in computer program product when training data changes. Determining target models that need to be retrained may reduce a total number of models that are trained by the model training system and reduces computational load per unit of time of the CPU and GPU model training systems.

Methods of reducing computational load of a machine learning model training system are provided. Methods may include changing model training data associated with a computer program product. The changes to training data may include adding new data points assigned to a label or assigning new labels to old data points. Changes to training data may enable new features of a computer program product. The changes may fix bugs in the computer program product.

Methods may include determining a plurality of target machine learning models included in the computer program product that require retraining as a result of changes to the training data. Methods may include estimating computational requirements for retraining each of the target machine learning models. Based on the estimated computational requirements, methods may include scheduling retraining of each of the plurality of target machine learning model on a model training system. Methods may include scheduling the retraining such that computational load of the model training system does not exceed a threshold level.

Methods may include serializing each of the plurality of target machine learning model after they are retrained. Methods may include storing each of the plurality of serialized target machine learning models together with training data applied by the model training system during the retraining.

An illustrative machine learning model training system may include a CPU training system. An illustrative machine learning model training system may include a GPU training system. Methods may include, for each of the plurality of target machine learning models, determining whether to retrain the target machine learning model using the CPU system or the GPU system.

CPU systems may consume less power than GPU systems. However, training models on a CPU system may take longer than training on a GPU system. CPU systems typically have faster clock speeds than GPU systems. However, GPU system typically include multiple processors arranged in parallel, which may yield overall faster performance. Methods may include using AI to determine which model training system to utilize for retraining a target model. An AI engine may account for structure of the training data, operational details of the target model, performance of a model training system, estimated time needed to train the target model, availability of a model training system and functionality of an operational domain that utilizes the target model.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative system 100. System 100 includes IVR system 101. IVR system 101 includes multiple machine learning models 105-115. Machine learning model 105 is configured to extract account information from inputs received from caller 103. IVR system 101 includes machine learning model 107 for determining an intent of inputs received from caller 103. Machine learning model 109 is configured to extract dates from the input received from caller 103.

Machine learning model 111 is configured to extract prosody information from inputs received from caller 103. Prosody information may include non-semantic aspects of speech. For example, prosody information may include changes in pitch, loudness, timbre, speech rate, and pauses. Machine learning model 113 is configured to extract semantic information from inputs received from caller 103. Semantic information may include logical aspects of meaning, such as sense, reference, implication, veracity, and logical form of speech. Sematic information may include word meanings and relationships between words.

Machine learning model 115 is configured to extract commands from inputs received from caller 103. Commands may be a directive from caller 103 instructing IVR system 101 to perform a task or function.

IVR system 101 may service operational domains 117. Each of operational domains 117 may have their own set of machine learning models 105-115. Each of operational domains 117 may use independent training data to generate machine learning models that are tuned to recognize specific nuances, language, commands and terminology associated with services or products offered by domains 117.

Training each of machine learning models 105-115 on independent data sets prepared for each of operational domains 117 may be computationally intensive. For example, each of models 105-115 may need to be trained for each domain—a total of eighteen models. When training data associated with each of domains 117 is changed, conventionally, each of models 105-113 may need to be retrained to ensure that changes to training data are incorporated into the respective machine learning models. Conventional systems would require retraining a total of eighteen models across all three operational domains 117.

Figure 2:
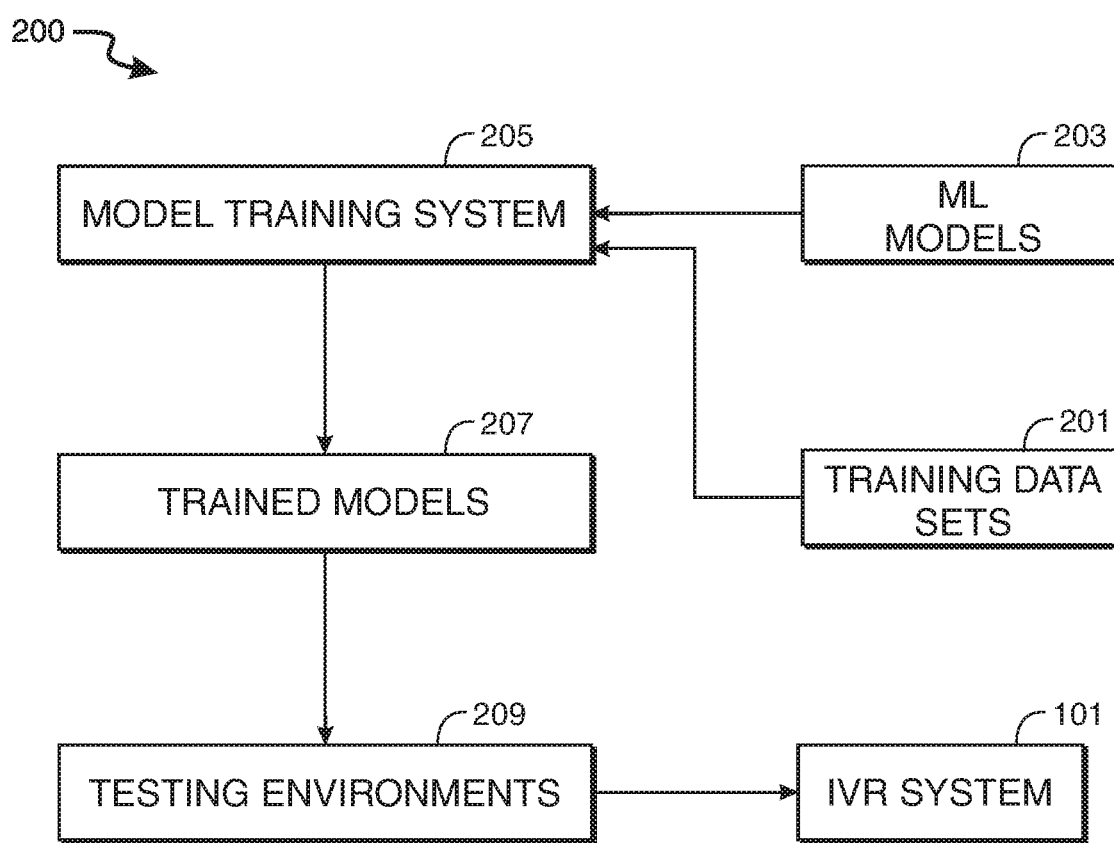
FIG. 2 shows an illustrative system in accordance with principles of the disclosure.

FIG. 2 shows illustrative testing system architecture 200. Architecture 200 may be used to test machine learning models 203 before they are deployed within IVR system 101 and interact with input received from caller 103. Machine learning models 203 may include one or more of machine learning models 105-115 (shown in FIG. 1). Architecture 200 shows that model training system 205 utilizes training data sets 201 to train machine learning models 203. Model training system 205 may train machine learning models 203 to understand caller inputs based on analysis of training data sets 201.

For example, during training, machine learning models 203 may assign weights or importance to specific aspects of test caller inputs included in training data 201. Trained models 207 may use the "learned" weights or importance to understand new caller inputs. Trained models 207 may be serialized and written to a file location.

Testing environments 209 may verify that after training, models 203 operate in an expected and logical manner. Testing environments 209 may verify that trained models 203 interpret new caller inputs in an expected and logical manner. Testing environments 209 may verify that trained models 203 interpret test caller inputs in an expected and logical manner. Testing environments 209 may include development, certification and production testing environments.

When training data 201 associated with machine learning models 203 is changed, machine learning models 203 may need to be retrained. After retraining, the models are retested in testing environments 209. Such an approach typically requires retraining and retesting all the machine models included in a computer program product, including those whose functionality may not have been impacted by the changes to training data 201. Unnecessary retraining and retesting of machine learning models causes waste of expensive and valuable computer resources.

Figure 3:
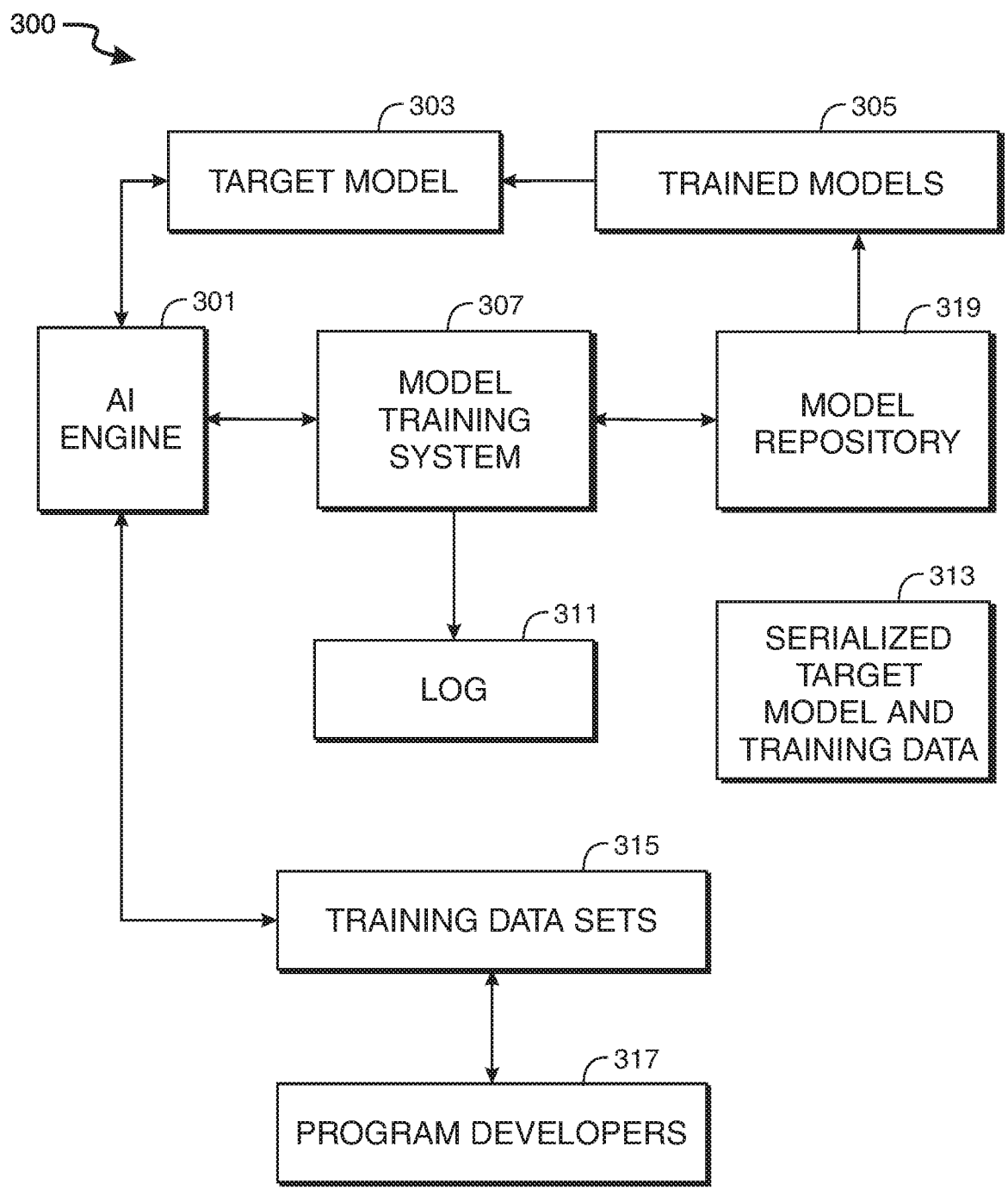
FIG. 3 shows an illustrative system in accordance with principles of the disclosure.

FIG. 3 shows illustrative system 300 for eliminating waste of expensive and valuable computer resources. System 300 includes AI engine 301. AI engine 301 may monitor changes to training data 315. For example, program developers 317 may change training data 315. Program developers 317 may change training data 315 when fixes bugs or adding new features to a computer program product.

In response to detecting changes to training data 315, AI engine 301 may determine machine learning models stored in model repository 319 that are impacted by the changes. For example, AI engine 301 may determine that training data 315 associated with some models has not been changed since those models have been last trained. In some embodiments, AI engine 301 may submit exemplary test inputs to a model. AI engine 301 may determine whether one or more models stored in repository 309 need to be retrained based on output of the model generated in response to the test inputs.

FIG. 3 shows that AI engine 301 has extracted target model 303 from among trained models 305. AI engine 301 has identified target model 303 as requiring retraining as a result of changes to training data 315. AI engine 301 may submit target model 303 and changed training data 315 to model training system 307. Model training system 307 may retrain target model 303 using changes applied to training data 315. Logging subsystem 311 may record which target models and associated training data have submitted by AI engine 301 to model training system 307.

Records created by logging subsystem 311 allow for tracking of model retraining and training-process verification, especially as they relate to new products or product features (e.g., reasons for changes to training data 315). Records created by logging subsystem 311 provide ongoing monitoring for evaluating whether machine learning models included in a computer program product are operational with features and functionality provided by the computer program products.

After model training system 307 completes retraining of target model 303, the retrained target model may be serialized and stored in model repository 319. The newly retrained and serialized model may be stored in model repository 319 together with the updated training data used by model training system 307 when retraining target model 303.

AI engine 301 ensures that only a subset of machine leaning models included in a computer program product are retrained in response to changes to training data. By isolating a target models for retraining, AI engine 301 reduces the number of machine learning models that are retrained by model training system 307. By isolating select target model 303 for retraining, AI engine 301 reduces a computational load of the model training system 307.

In some embodiments, AI engine 301 may submit serialized and retrained model 313 for retesting to testing environments 209 (shown in FIG. 2). By limiting retesting to only the target models that have been retrained, AI engine 301 may reduce the number of machine learning models that are retested by testing environments 209, reducing a computational load of the testing environments 209.

Figure 4:
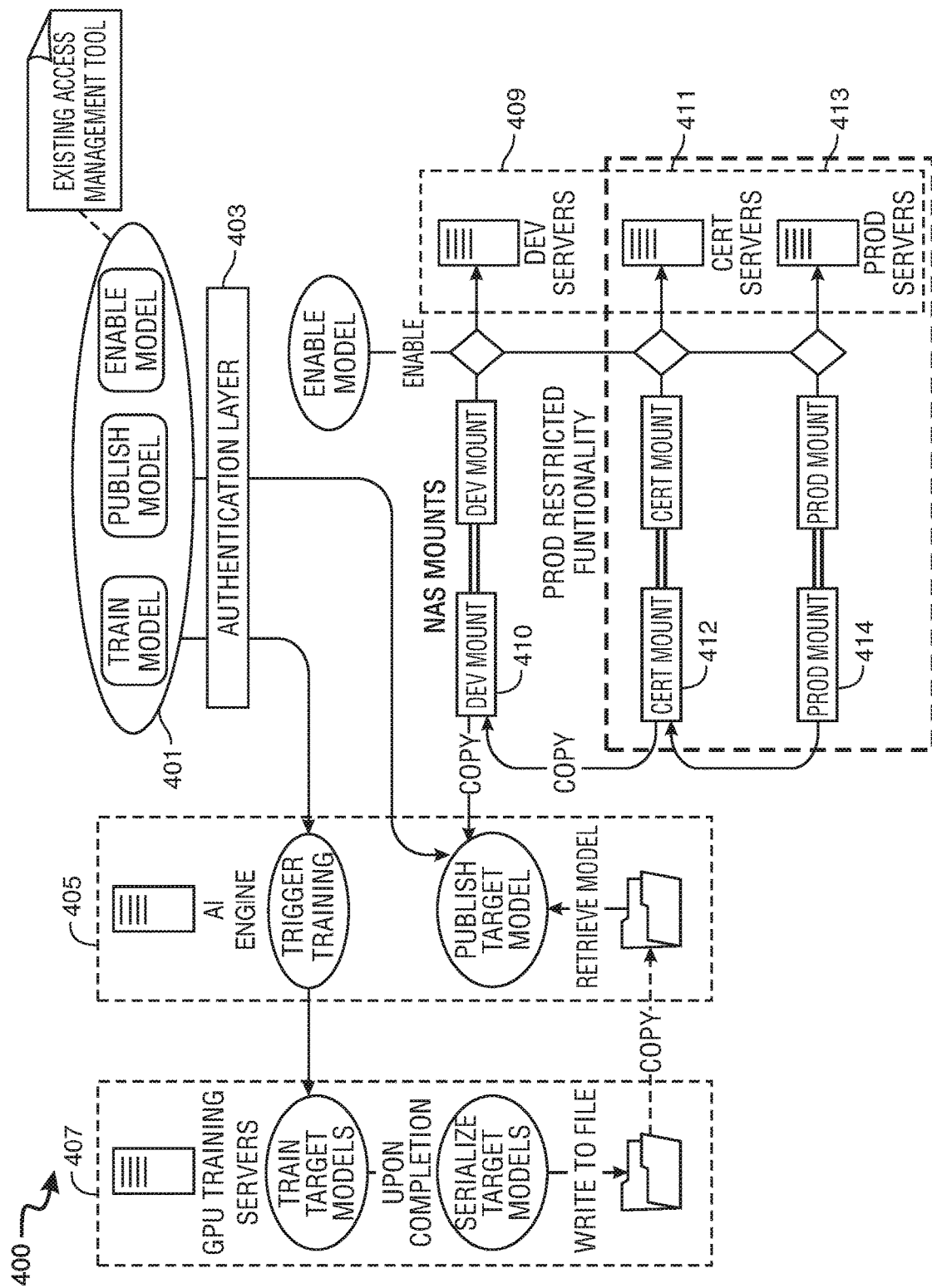
FIG. 4 shows an illustrative system in accordance with principles of the disclosure.

FIG. 4 shows illustrative system 400. System 400 includes frontend user interface ("UI") 401. UI 401 provides users, such program developers 317, access to training data 201. UI 401 may provide program developers 317 access to software tools for training, publishing and enabling models.

When program developers 317 make changes to training data 315, AI engine 405 may determine whether any machine learning models need to be retrained as a result of the changes. AI engine 405 may include one or more features of AI engine 301 (shown in FIG. 3). AI engine 405 may package retrained models with the training data used to train the target model. AI engine 405 may also determine that models whose training data has not be changed do not need to be retrained.

Authentication layer 403 only allows authorized users to input changes to training data 315. When AI engine determines that changes to training data 315 are significant to warrant a retraining of a target machine learning model, AI engine 405 may trigger model training system 407 to perform the retraining.

AI engine 405 may compare changes to the training data with training data associated with machine learning models included in a computer program product. AI engine 405 may select any model whose training data has been changed for retraining. AI engine 405 may identify a target machine learning model for retraining based on comparing versions of training data or testing a model using the changed training data and comparing output of the model in response to changed training data to an expected output of the model.

AI engine 405 may direct model training system 407 to target models and associated changed training data. In some embodiments, AI engine 405 may extract target models and training data and transfer the extracted target model and training data to models training system 407. In some embodiments, AI engine 405 may direct model training system 407 to a storage location of the target model and associated training data. AI engine 405 may instruct model training system 407 to retrain a target model identified by AI engine 405 using the updated training data. Model training system 407 may serialize the target model after the retraining and write the retrained model to a file.

After a model is retrained and written to a file, the retrained model may be ready for testing. Program developers 317 may utilize UI 401 to issue a command to test a retrained model. Authentication layer 403 may prevent unauthorized users from issuing testing commands. In response to detecting an authorized testing command, AI engine 405 may retrieve the model from its file location and publish the model to one or more of testing environments 409, 411 and 413.

Publishing a model may include copying the model to network accessible storage locations 410, 412 and/or 414. A testing environment may include development testing servers 409. Development testing servers 409 may include a run-time environment, hardware and software utilities for debugging machine learning models. AI engine 405 provides development testing servers 409 access to the serialized model for testing via storage location 410.

Development testing servers may confirm that a target model is meeting its functional requirements. When a target model passes the development testing, the target model may be further tested by certification testing servers 411. Certification testing servers 411 may include a run-time environment, hardware and software utilities for determining whether a machine learning model meets regulatory standards. AI engine 405 provides development testing servers 411 access to the serialized model for testing via storage location 410. In some embodiments, after completion of testing, development testing servers 409 may copy the serialized model from location 410 to location 412.

AI engine 405 provides certification testing servers 411 access to the serialized model for testing via storage location 412. In some embodiments, after completion of testing, certification testing servers 409 may copy the serialized model from location 412 to location 412. Using AI engine 405 to provide testing environments access to a target model ensures that each testing environment is testing the identical model. Using AI engine 405 to coordinate access to a target model ensures that each of the testing environments 409, 411 and 413 access and test the identical model.

When a target model passes certification testing, the target model may be further tested by production testing servers 413. Production testing servers 413 provide a computing setting for testing the target model using live data provided by end users such as caller 103.

AI engine 405 provides centralize access, testing and training of targeted machine learning models impacted by changes to training data. AI engine 405 allows targeted machine learning models to be generated once (based on updated training data) and one copy of the retrained model is propagated to each of the different testing environments. AI engine 405 reduces a computational burden on model training system 407. AI engine 405 also simplifies tracking of the retrained model as it progresses through testing environments 409, 411 and 413.

Figure 5:
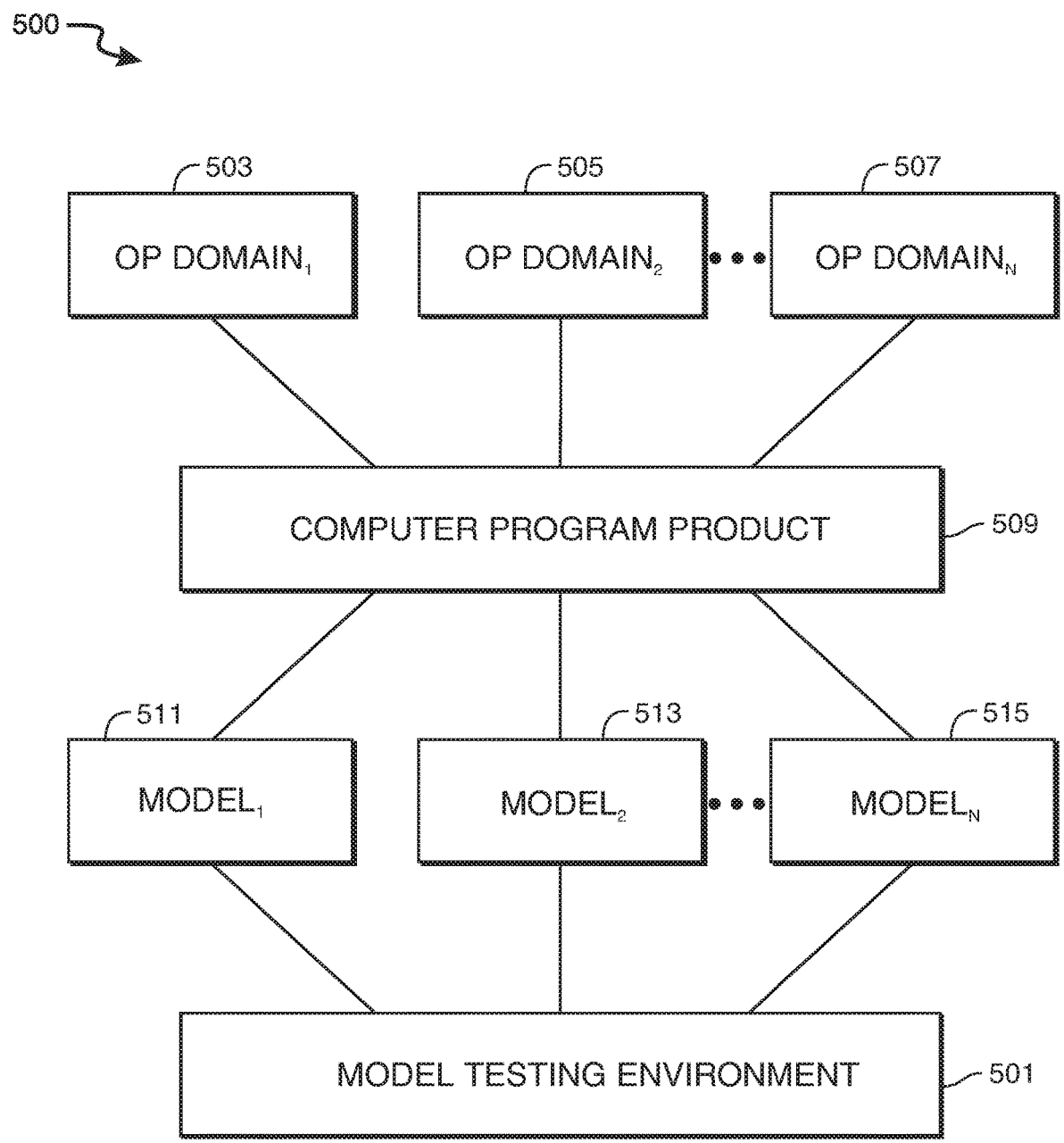
FIG. 5 shows an illustrative system in accordance with principles of the disclosure.

FIG. 5 shows illustrative system 500. System 500 includes computer program product 509. Computer program product 509 may be an IVR system. System 500 shows that computer program product 509 is utilized by operational domains 503, 505 and 507. Computer program product 509 includes machine learning models 511, 513 and 515. Each of machine learning models 511, 513 and 515 may be specially trained using unique training data for each of operational domains 503, 505 or 507. However, each of machine learning models 511, 513 and 515, regardless of which operational domain they are trained for, may be tested in model testing environment 501.

Figure 6:
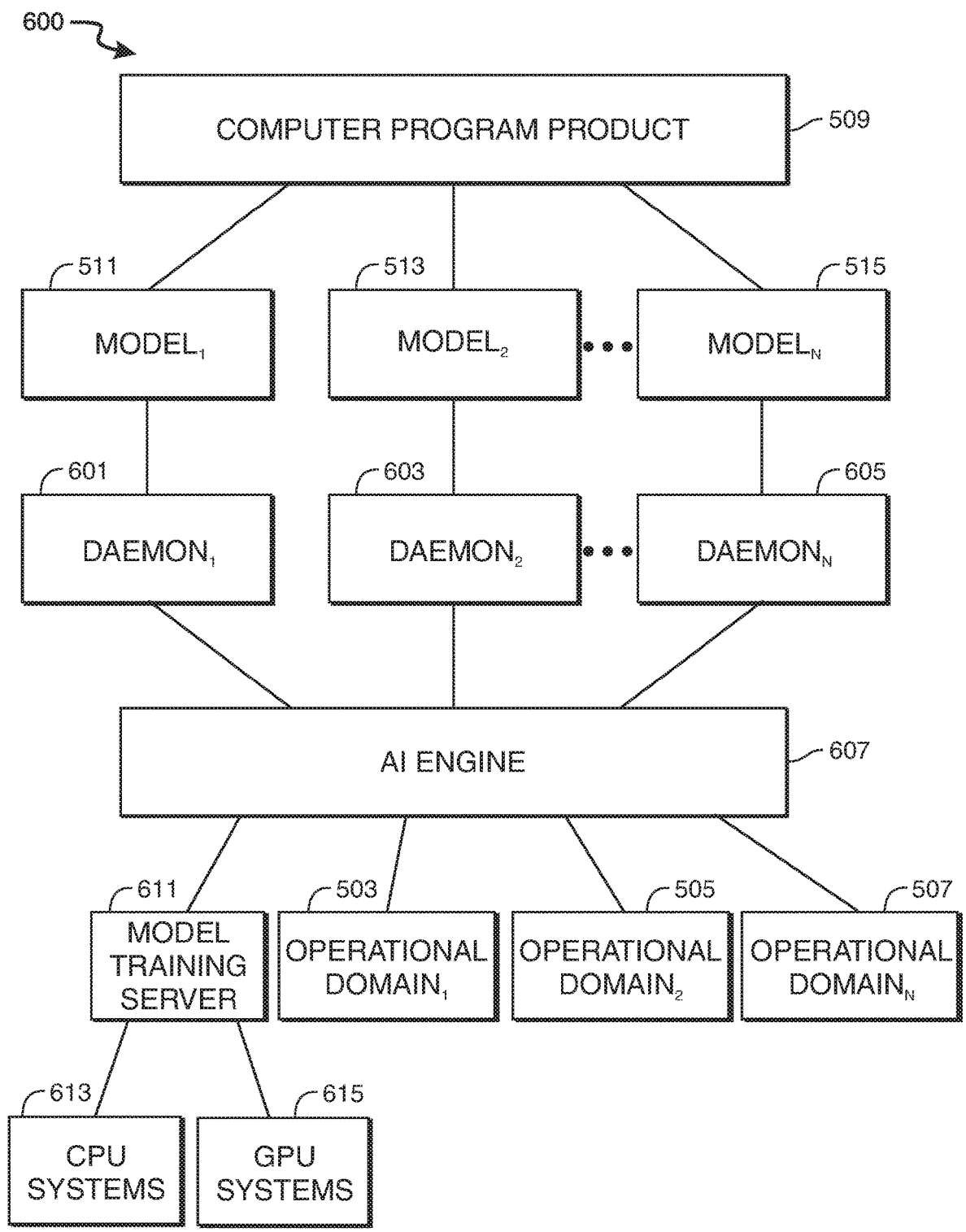
FIG. 6 shows an illustrative system in accordance with principles of the disclosure.

FIG. 6 shows illustrative AI system 600. AI engine 607 has identified target models 511, 513 and 515 as requiring retraining by model training system 611. AI engine 607 may include one or more features of AI engine 301 (shown in FIG. 3) and AI engine 405 (shown in FIG. 4). As shown above in FIG. 5, each of target models 511, 515 and 513 may be utilized by operational domains 503, 505 and 507. To ensure that target models 511, 513 and 515 are retrained using training data associated with the appropriate operation domain, AI engine 607 may determine requirements for retraining a target model across all operational domains 503, 505 and 507.

For example, AI engine 607 may determine that model 511 is utilized by operational domains 503 and 505. However, operational domains 503 and 505 may utilize model 511 in connection with identical training data. AI engine 607 may assign daemon 601 to schedule retraining of model 511. AI engine 607 may configure daemon 601 to retrain model 511 once for both operational domains 503 and 505. AI engine may configure daemon to save copies of the retrained model 511 in locations accessible by operational domain 503 and operational domain 505.

As a further example, AI engine 607 may determine that target model 513 is utilized by operational domains 503 and 507. Operational domain 503 may utilize target model 511 in connection with a first set of training data. Operational domain 507 may utilize target model 511 in connection with a second set of training data. AI engine 607 may assign daemon 603 to schedule retraining of target model 513.

The first set of training data applied when retraining target model 513 for operational domain 503 may be different than the second set of training data applied when retraining target model 513 for operational domain 507. AI engine 607 may configure daemon 603 to retrain model 513 for operational domain 503 (using the first set of training data) on CPU system 613. AI engine 607 may configure daemon 603 to retrain model 513 for operational domain 507 (using the second set of training data) on GPU system 615. FIG. 6 shows that one daemon, such as 603 may manage retraining of model 513 across two or more operational domains.

Figure 7:
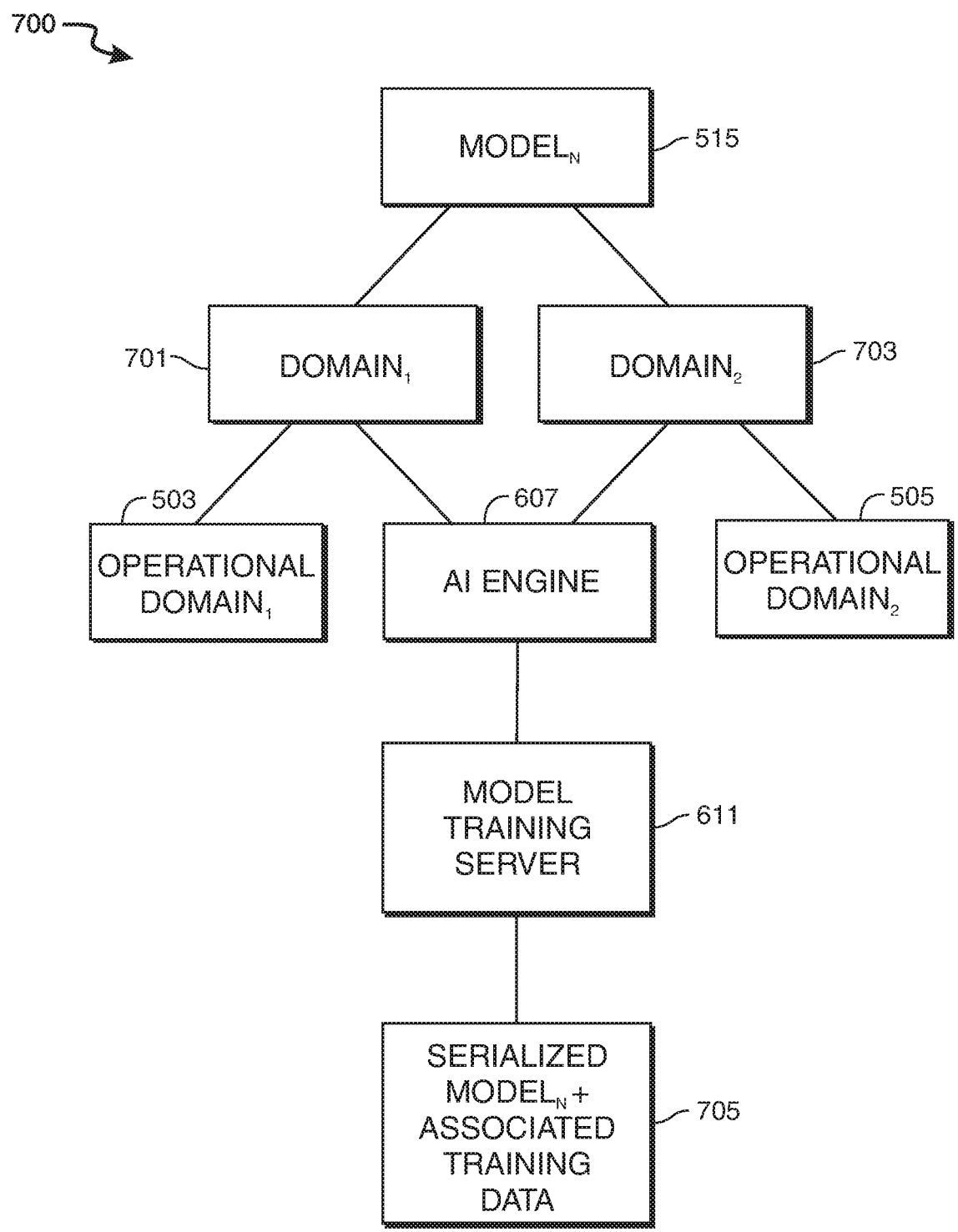
FIG. 7 shows an illustrative system in accordance with principles of the disclosure.

FIG. 7 shows illustrative AI system 700. In AI system 700 target model 515 is associated with two daemons, 701 and 703. Each daemon may be assigned by AI engine 607 to retrain target model 515 in connection with a different operational domain. For example, daemon 701 may be configured to retrain target model 515 for operational domain 503. Daemon 701 may locate a training data set utilized by operational domain 503. Daemon 701 may determine whether to utilize CPU system 613 or GPU system 615 of model training system 611 for retraining model 515 in connection with operational domain 503.

Daemon 703 may be configured to retrain target model 515 for operational domain 505. Daemon 703 may locate a training data set utilized by operational domain 505. Daemon 703 may determine whether to utilize CPU system 613 or GPU system 615 of model training system 611 for retraining model 515 in connection with operational domain 505.

Each of daemons 701 and 703 may schedule retraining of target model 515 for the corresponding operational domain. Each of daemons 701 and 703 may schedule retraining of target model 515 independently of each other. However, after each of daemons 701 and 703 successfully schedule their respective retraining of target model 515 on model training system 611, each instance of retrained model 515 may be stored in central model repository 705. Each instance of retrained model 515 may be stored in central model repository 705 together with the training data used to retrain model 515. Storing retrained models in central model repository 705 together with the applied training data may allow AI engine 607 to determine whether model 515 needs to be retrained again in response to future changes to the training data.

Figure 8:
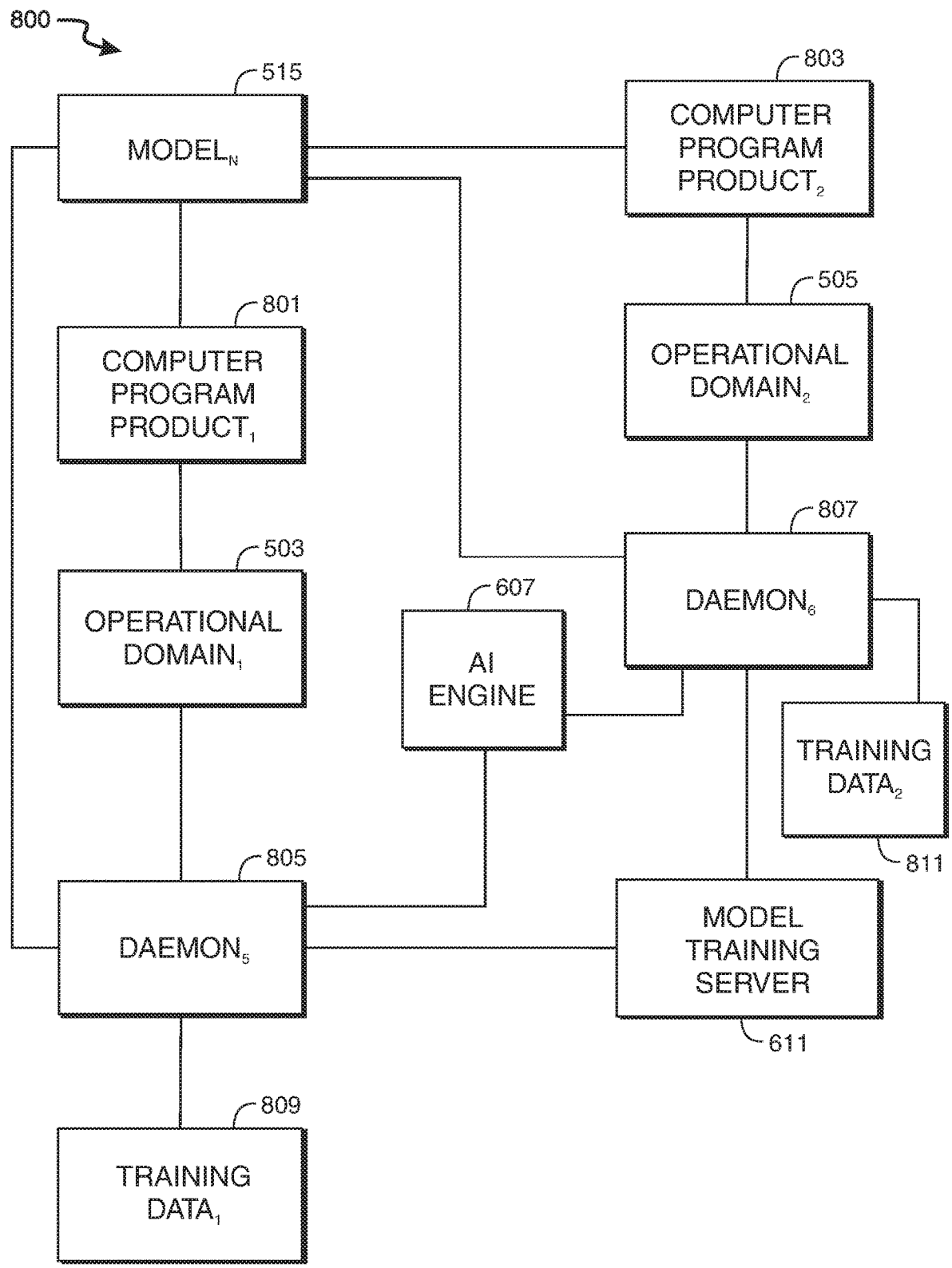
FIG. 8 shows an illustrative system in accordance with principles of the disclosure.

FIG. 8 shows illustrative AI system 800. In AI system 800, model 515 is utilized by computer program product 801 in operational domain 503. In AI system 800, model 515 is also utilized by computer program product 803 in operational domain 505. AI engine 607 has detected a change to training data 809 associated with model 515. AI engine 607 has assigned daemon 805 to determine whether the change to the training data 809 require retraining of model 515 in connection with computer program product 801. AI engine 607 assigns daemon 807 to determine whether the change to the training data 811 requires retraining of model 515 in connection with computer program product 803.

Daemon 805 may examine training data 809 and determine that model 515 needs to be retrained in connection with computer program product 801. Daemon 807 may examine training data 811 and determine that model 515 needs to be retrained in connection with computer program product 803. AI engine 607 may then determine whether the retraining of model 515 for use in connection with computer program products 801 and 805 can be combined. Combining retraining of model 515 may reduce a computational load of model training system 611 per unit of time.

For example, training data 809 may be more comprehensive than training data 811. A more comprehensive data set may include additional information than a less comprehensive data set. AI engine 607 may determine that net computational savings will result by retraining model 515 once, for both computational program products 801 and 803 using the more comprehensive training data set 809. Although using training data set 809 to retrain model 515 for computer program product 803 results in over-training of model 515, it may be more efficient to do so rather than retraining model 515 twice.

Figure 9:
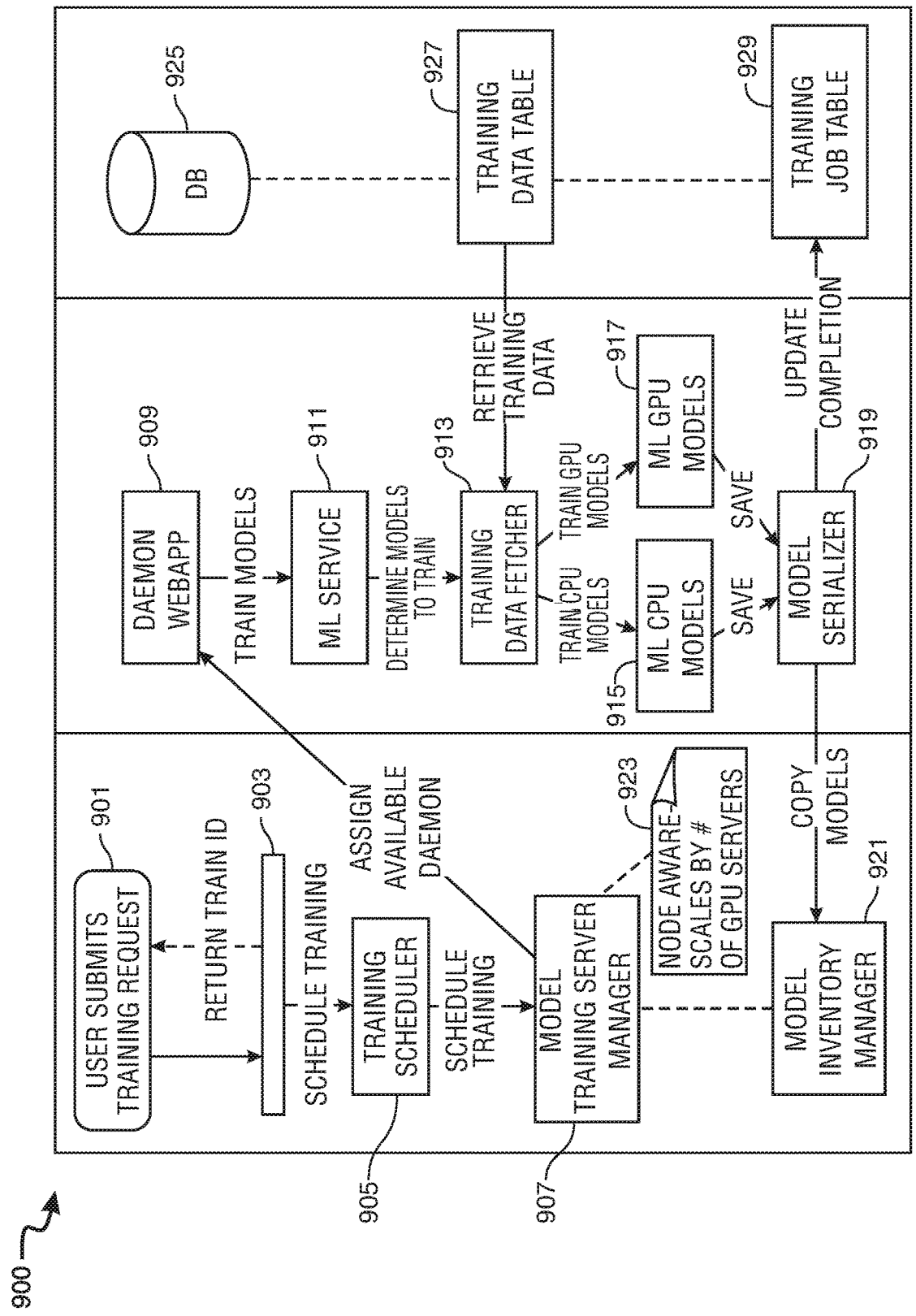
FIG. 9 shows an illustrative system and process in accordance with principles of the disclosure.

FIG. 9 shows illustrative process 900. Process 900 may begin at 901. At 901, a user submits a request to update or change training data. The request to change training data may include a request to retrain machine learning models that have been previously trained using the training data. At 903, the training request is entered into a scheduling system and the user is provided with a training identifier.

Training scheduler 905 may submit the training request to model training system manager 907. Training scheduler 905 may be a component of AI engine 607. Model training system manager 907 may be a component of AI engine 607. Model training system manager 907 assigns daemon webapp 909 to the training request 901. Daemon webapp 909 may be a daemon, such as daemon 601, 701 or 805.

Daemon webapp 909 may submit user requested changes 901 to machine learning service 911. Machine learning service 911 may be a component of AI engine 607. Machine learning service 911 may determine one or more target machine learning models that need to be retrained as a result of the training request 901. Machine learning service 911 may instruct data fetcher 913 to extract source code needed to retrain the identified target models. Machine learning service 911 may also determine whether a target model is to be retrained on CPU system 915 or GPU system 917. In some embodiments, source code associated with a target model may determine whether a target model is retrained on CPU system 915 or GPU system 917.

After a target model is retrained, model serializer 919 passes a copy of the retrained target model to model inventory manager 921. Model inventory manager 921 may coordinate storage of the serialized model in a central model repository. Model serializer 919 may record the successfully retraining of the target model in training job table 929.

Training data table 927 may link source code for the retrained target model and training data applied when retraining the target model. Data fetcher 913 may access training data table 927 to locate source code or associated training data needed by CPU system 915 or GPU system 917.

Independent training data tables 927 may exist for different operational domains. Independent training job tables 927 may exist for different operational domains. Both training data table 927 and training job table 929 may be stored in database 925.

Figure 10:
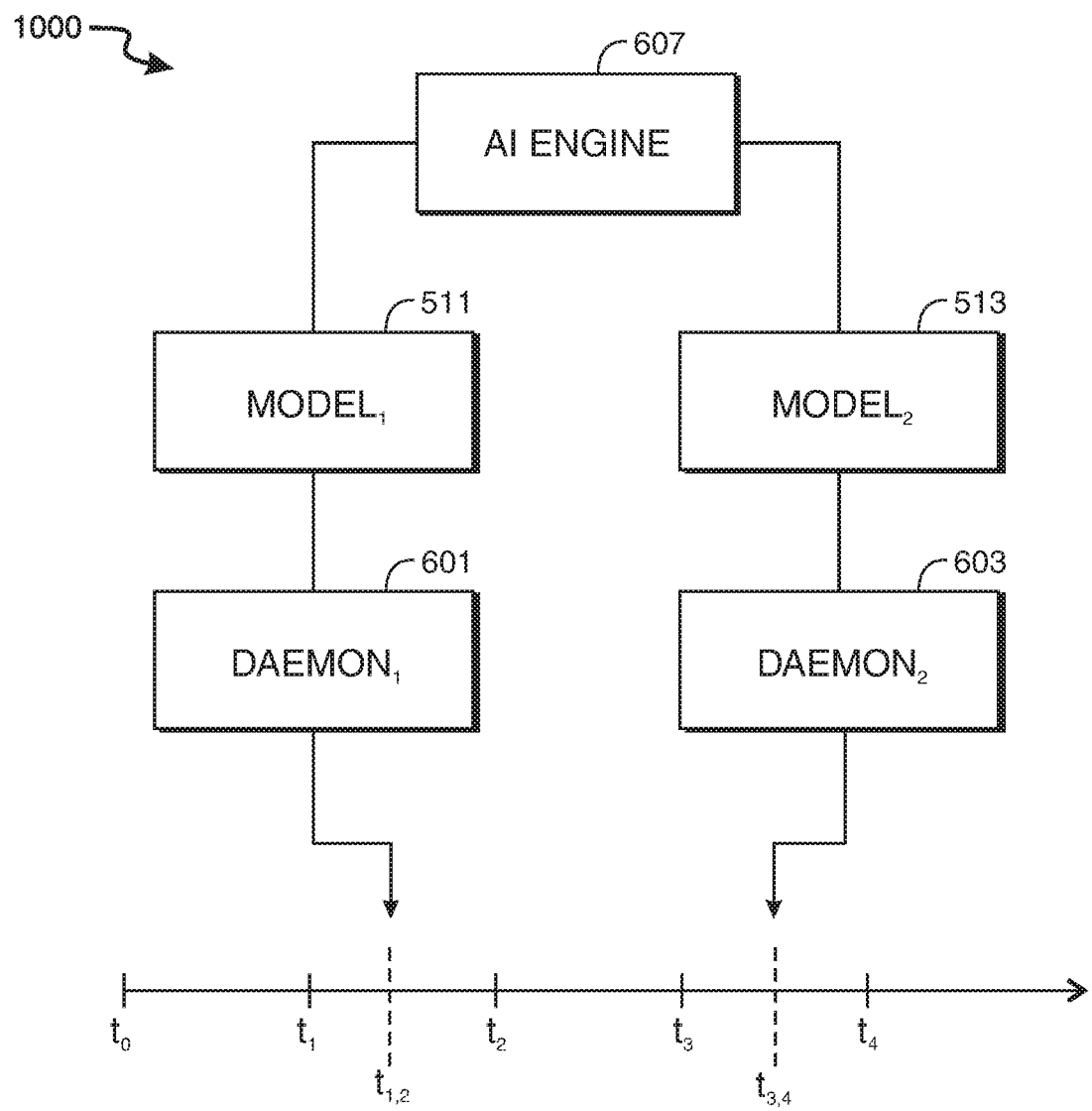
FIG. 10 shows an illustrative scenario in accordance with principles of the disclosure.

FIG. 10 shows illustrative scenario 1000. In scenario 1000, AI engine 607 has assigned daemon 601 to manage retraining of target model 511. AI engine 607 has also assigned daemon 603 to manage retraining of target model 513. Scenario 1000 shows illustrative scheduling of model retraining by daemons 601 and 603.

Scenario 1000 shows that model retrainings have already been scheduled at $t_1$, $t_2$, $t_3$ and $t_4$. Daemon 601 has determined that the retraining of target model 511 can be completed at $t_{1,2}$, which is between $t_1$ and $t_2$. A model training system may have been otherwise idle at $t_{1,2}$. A model training system may be active at $t_{1,2}$, however daemon 601 may determine that even adding the retraining of model 511 at $t_{1,2}$ may not exceed a computational capacity of the model training system. Daemon 601 may determine that if retraining model 511 begins at $t_{1,2}$, it will be complete before $t_2$. Daemon 601 may determine that if retraining model 511 begins at $t_{1,2}$, it will be complete before a computational capacity of the model training system exceeds a threshold limit.

Daemon 603 has determined that the retraining of target model 513 can be completed at $t_{3,4}$, which is between $t_3$ and $t_4$. The retraining of model 513 may be completed before the target model scheduled for retraining at $t_4$.

Thus, apparatus and methods for a MACHINE LEARNING MODEL TRAINING SYSTEM have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. An artificial intelligence ("AI") method of reducing computational load of a machine learning model training system, the method comprising:
   changing model training data associated with a computer program product;
   determining a plurality of target machine learning models included in the computer program product that require retraining as a result of changing the model training data;
   estimating computational requirements for retraining each of the target machine learning models;
   based on the estimated computational requirements, scheduling the retraining of each of the plurality of target machine learning models on a model training system such that the computational load of the model training system does not exceed a threshold level;
   serializing each of the plurality of target machine learning models after retraining; and
   storing each of the plurality of serialized target machine learning models together with the training data applied by the model training system when retraining each target machine learning model;
wherein:
   a first model in the plurality of target machine learning models is associated with a first operational domain and a second operational domain;
   a first daemon is assigned to the first model and is associated with the first operational domain;
   a second daemon, different from the first daemon, is assigned to the first model and is associated with the second operational domain; and
   each daemon formulates a training data set specific to the respective operational domain for retraining the first model.

2. The AI method of claim 1, wherein the model training system comprises a CPU subsystem and a GPU subsystem, the method further comprising, for each of the plurality of target machine learning models, determining whether to retrain the target machine learning model using the CPU subsystem or the GPU subsystem.

3. The AI method of claim 1, further comprising providing, to a plurality of a testing environments, centralized access to the stored serialized target machine learning models and training data applied by the model training system.

* * * * *